US005140820A

United States Patent [19]

Booz

[11] Patent Number: 5,140,820

[45] Date of Patent: Aug. 25, 1992

[54] CARBURETION AND COMBUSTION SYSTEM FOR GAS TURBINE ENGINES

[76] Inventor: Edward Booz, 124 Rolling Hills Road, R.D. #2, Pipersville, Pa. 18947

[21] Appl. No.: 614,094

[22] Filed: Nov. 14, 1990

[51] Int. Cl.[5] .............................................. F02C 7/00

[52] U.S. Cl. ........................................ 60/737; 60/749

[58] Field of Search ................. 60/737, 738, 740, 748, 60/749

[56] References Cited

U.S. PATENT DOCUMENTS 3,570,242 3/1971 Leonardi et al. ..................... 60/737

4,713,938 12/1987 Willis ................................... 60/748

FOREIGN PATENT DOCUMENTS 2944863 5/1981 Fed. Rep. of Germany ........ 60/737

*Primary Examiner*—Louis J. Casaregola

*Attorney, Agent, or Firm*—Frank J. Benasutti

[57] ABSTRACT

A carburetion and combustion system is provided in which the carburetor discharges a combustible fuel/air mixture in a rotating swirl from a plurality of nozzles at one end of a cylindrical combustion chamber, and discharges a rotating helical swirl of high-velocity compressor air concentrically surrounding the combustion mixture from a second set of nozzles. The high-velocity air swirl confines the flame propagation away from the combustible chamber walls and provides the walls with an insulating layer against the combustion heat.

3 Claims, 3 Drawing Sheets

FIG. 1
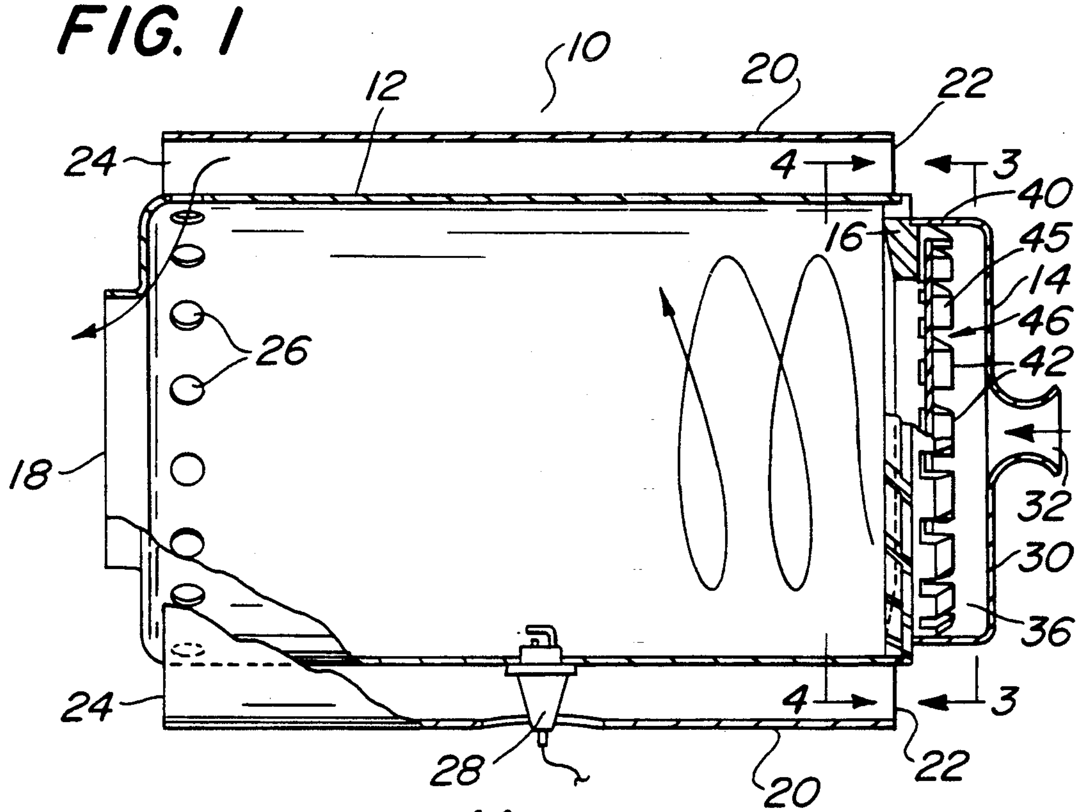
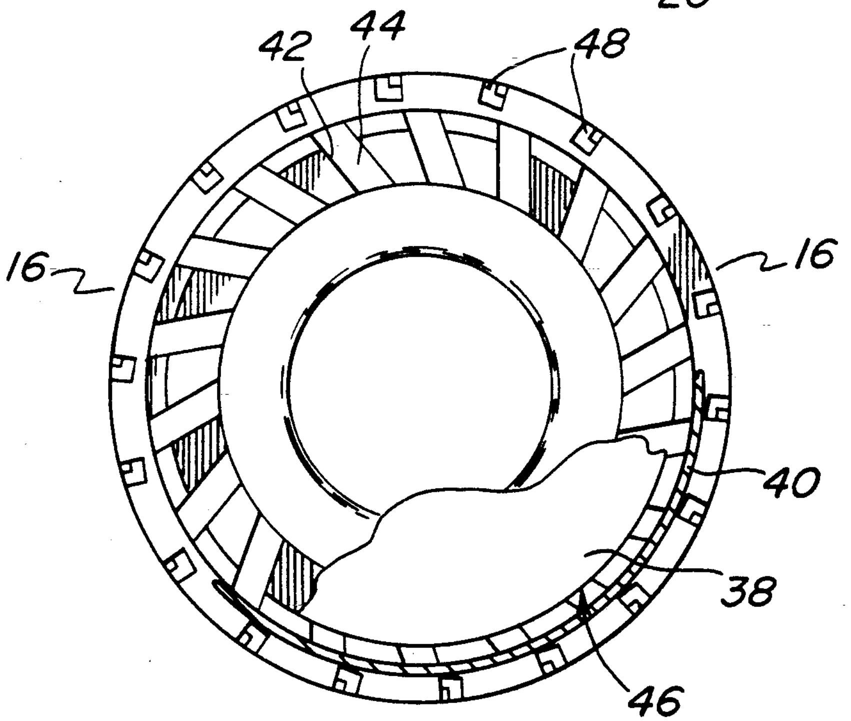
FIG. 3

FIG. 5
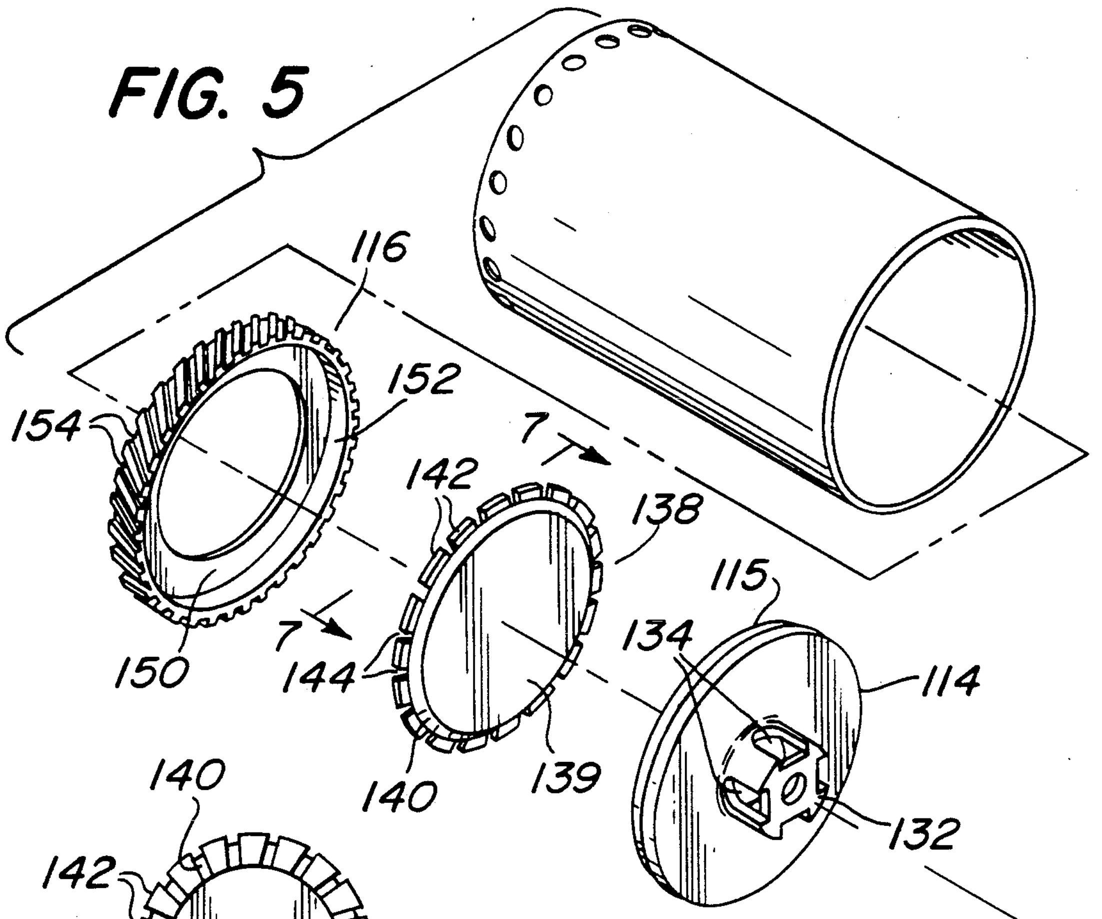
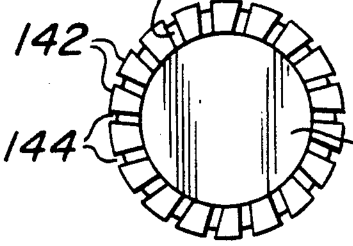
FIG. 7
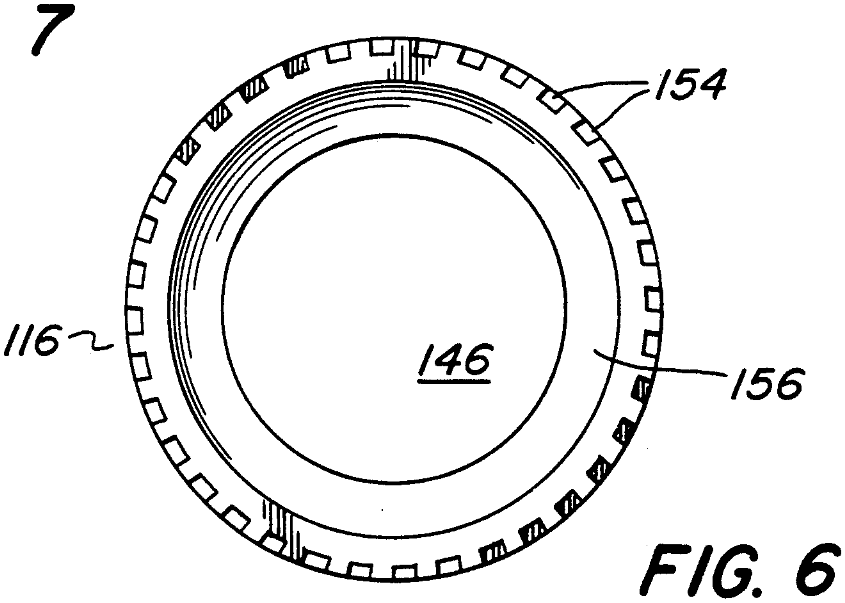
FIG. 6

CARBURETION AND COMBUSTION SYSTEM FOR GAS TURBINE ENGINES

TECHNICAL FIELD

This invention is related to the general area of gas turbine technology, and in particular to a unique carburetion and combustion system for gas turbine engines.

BACKGROUND OF THE INVENTION

Gas turbine carburetion systems are typically directed to the sole function of mixing fuel and air in the proper combustible proportion for various power settings and ambient conditions and supplying the mix to the combustion chamber or burner cans in a combustible stream. The combustion chambers or cans experience extreme heat, which requires them to be constructed of or lined with high-temperature resistant metals. This adds cost and weight to the engine, and in the case of extremely small engines, such as a turbojet engine for model aircraft, the cost and weight penalty makes the engine impractical for that use.

In appreciation of these problems, the present invention is directed to a carburetion and combustion system in which the combustion flame pattern is contained away from the walls of the combustion chamber and a boundary of un-combusted air flow along the chamber walls provides an insulating layer against combustion heat. This allows the combustion chamber to be constructed of light-weight, inexpensive materials such as aluminum. Other advantages will be apparent from the description which follows.

This invention has been developed and tested primarily in conjunction with small-scale turbojet engines for model aircraft, where the need to achieve lower cost, simplicity and light weight is imperative to make such engines practical. The applications and benefits of the invention extend beyond small scale engines, and can be adapted to larger scale for stationary and portable power units, aircraft auxiliary power units, drone propulsion engines, or full size aircraft.

SUMMARY OF THE INVENTION

A carburetion and combustion system is provided in which the carburetor discharges a combustible fuel/air mixture in a rotating swirl from a plurality of nozzles at one end of a cylindrical combustion chamber, and discharges a rotating helical swirl of high-velocity compressor air concentrically surrounding the combustible mixture from a second set of nozzles. The high-velocity air swirl confines the flame propagation away from the combustion chamber walls and provides the walls with an insulating layer against the combustion heat.

BRIEF DESCRIPTION OF THE DRAWINGS

FIG. 1 is a longitudinal section view of a carburetion and combustion system according to the present invention.

FIG. 3 is a view taken along the lines 3—3 of FIG. 1, which depicts the front or outside face of the nozzle ring, with a portion of the housing rim and a portion of the baffle plate removed to reveal otherwise covered structure.

FIG. 5 is an exploded perspective view of a second embodiment of a carburetion and combustion system according to the invention, with the by-pass cowling removed.

FIG. 6 is a view similar to FIG. 3, but of the second embodiment shown in FIG. 5.

FIG. 7 is a front view of the reverse side of the plate 138 of FIG. 5, in the direction shown by arrows 7—7.

DETAILED DESCRIPTION

Figure 2:
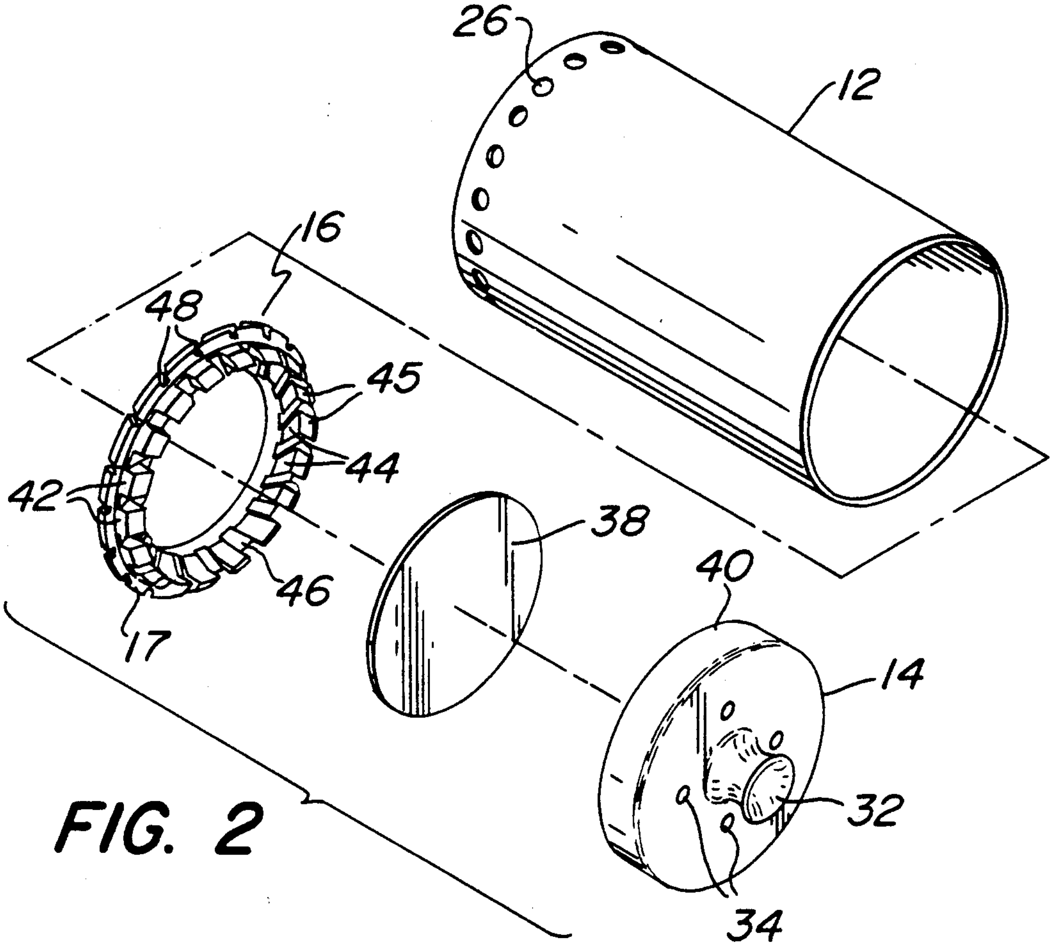
FIG. 2 is an exploded perspective view of one embodiment of a carburetion and combustion system as in FIG. 1, with the bypass cowling omitted.

FIG. 1 depicts a carburetion and combustion section 10 of a turbojet engine for model aircraft. Those familiar with gas turbine engines will recognize the functional components of the engine which are not depicted and need no specific description, such as the compressor, turbine section, exhaust nozzle, and other common components; and will understand the function and location of such components when they are mentioned in this description.

The carburetion and combustion section 10 includes a cylindrical combustion chamber 12, capped at its inlet end by a carburetor housing 14 and nozzle ring 16, and has at its opposite end a gas discharge port 18. As known to those skilled in the art, port 18 discharges hot combustion gas to the inlet of a turbine to extract power, which may be used to drive a compressor and accessories in an aircraft engine, or a power shaft in a gas turbine power unit. The combustion chamber 12 is co-axially surrounded by a cylindrical by-pass shroud 20 which is open at both ends to form an inlet 22 and an outlet 24 for by-pass air. As known to those skilled in the art, excess compressor air may be efficiently used by ducting it around the combustion section and mixing it back into the combustion gas stream prior to turbine inlet (hence "by-pass"). Both the bypass outlet 24 and the combustion chamber gas discharge port 18 discharge into the turbine inlet. A plurality of orifices 26 are disposed at evenly spaced intervals around the circumference of the combustion chamber near the bypass outlet 24 to allow by-pass air through the orifices to balance the pressure entering the turbine inlet from the discharge port 18 and the bypass outlet 24. Those familiar with conventional burner cans and liners will note that the complex grid of air inlet holes normally found over most of the length of such liners to sustain combustion is not required with this invention.

One or more ignitors 28 are disposed around the circumference of the engine at approximately mid-length along the combustion chamber 12. Those skilled in the art will understand the function of ignitors without further description. Continuous ignition is not required in normal operating conditions; combustion is self-sustaining following initial ignition and stabilization of the flame pattern. The ignitor may be de-energized manually or automatically after ignition.

The carburetion section 30 includes the previously mentioned carburetor housing 14 and nozzle ring 16. The carburetion section performs more than the traditional function of pre-mixing fuel and air in combustible proportion; it produces a center directed rotating swirl discharge of fuel/air mixture concentrically surrounded by a rotating helical swirl of high pressure compressor air. These concentric streams, with the combustible mix swirled inside the high velocity air, confines the flame propagation pattern to the center of a flame holder plate at the front end of the combustion chamber 12 and away from the chamber walls. The chamber walls are therefore insulated from combustion heat by the boundary of compressor air and the confinement of the flame pattern.

As an introduction to describing the structural elements which are means for creating the concentric streams in the two embodiments described, a general description is as follows:

1. The fuel/air mixture is discharged by angled nozzles located around the circumference of the flame holder plate which direct the combustible mix across the plate toward the axial center of the chamber. The nozzles face each other in a circular pattern angled slightly offset from the radial direction to the center of the plate, which causes the mixture to swirl toward and around the center of the plate as it ignites.

2. As the swirling combustible mix ignites, the flame propagation attaches to the center of the plate in a tight pattern and directs expansion of the combustion gasses downstream in the chamber.

3. A helical swirl of high velocity air is produced by air nozzles evenly spaced around the circumference of the carburetor outboard of the fuel/air mix nozzles. The nozzles are angled downstream to produce a rotating helical swirl surrounding the combustible mix, which holds the flame in the forward end and to the center of the combustion chamber and creates an insulating layer along the inner walls of the chamber.

Turning now to the structure of one embodiment, as depicted in FIG. 2, the carburetor housing 14 forms a centered fuel inlet duct 32. As this application is for a model aircraft engine, the duct 32 forms a venturi nozzle and is adapted to receive a terminal fitting from a propane gas supply line. With liquid fuels, an atomizing spray nozzle would be used. Arranged in a square pattern around the fuel duct 32 are air inlet openings 34, which port compressor air into the carburetor housing 14. A space between the inner surface of the housing 14 and the nozzle ring 16 creates a mixing chamber 36, where the gaseous fuel and compressor air are slowed and mixed. Again as shown in FIG. 2, a plate 38 is disposed inside the mixing ring 16. For ease in fabrication, the plate 38 is fabricated as a separate component and assembled into the ring 16, but it should be understood that the plate and ring could be fabricated as an integral part. The face of the plate 38 toward the air inlets and fuel port defines a side of the mixing chamber 36 and baffles the air and fuel radially outward toward the circumference of the fuel nozzle ring 16 and the rim flange 40 of the housing 14 as may be better visualized by reference to FIG. 1.

FIGS. 1 and 2 show the mating surfaces of the housing 14 to the nozzle ring 16. The rim flange 40 of the housing mates against a plurality of evenly spaced posts 42 disposed in a circular pattern inset slightly from the circumference of the nozzle ring 16, such that an outer circumferential band 17 of the ring 16 lies outside the housing 14. This outer band 17 contains the compressor air swirl nozzles as described further on. The posts 42 are shaped to make a tight conforming seal fit against the inner face of the rim flange 40, and are contoured slightly inward at their tips to ease the installation of the housing over them. The rim flange may be clamped against the posts by a band clamp or other fastener suited to the particular pressures encountered. The posts 42 rise out of channels 44 in the same angular line, as seen in FIG. 2. The flat top surfaces of the channels 44 support the plate 38. The inner side surfaces 45 of the posts 42 are vertical to the channels 44 and as a group form a circular contour closely conforming to the circumference of the plate 38 to hold the plate in a press fit.

The posts 42 also serve a inlet guides for the fuel/air mixture swirl nozzles. As best seen by reference to FIG. 3, the posts 42 and channels 44 are angled approximately 45 degrees to their corresponding radial lines on ring 16. The spaces between the adjacent posts 42 act as slots designated generally 46 opening to the channels 44 under the plate 38, as best seen in FIG. 3. The flow path of the fuel/air mixture is thus from the mixing chamber 36 spreading radially outward along the inner face of the plate 38, further expanded and given angular rotation in the slots 46 created by the posts 42, then reversing around the end of the plate into the angled channels 44 which expand and direct the mixture in a rotating swirl across the face of the plate 38 inside the combustion chamber. This inner face of plate 38 acts as the flame holder plate.

The outer band portion 17 of the nozzle ring 16, as mentioned previously, has angled air slot nozzles 48 at evenly spaced intervals which pass through the circumferential rim of the nozzle ring at an approximate 45 degree angle to the radial. The nozzles 48 constrict in size from their inlet side to the discharge side into the combustion chamber, as shown in FIG. 3. The carburetor housing 14 does not cover the nozzles 48; consequently, they receive only compressor air. This high pressure air is accelerated and given angular rotation by the constricting air nozzles 48, resulting in a high velocity helical swirl directed downstream, surrounding the combustible mix and insulating the combustion chamber walls from combustion gas heat.

Figure 4:
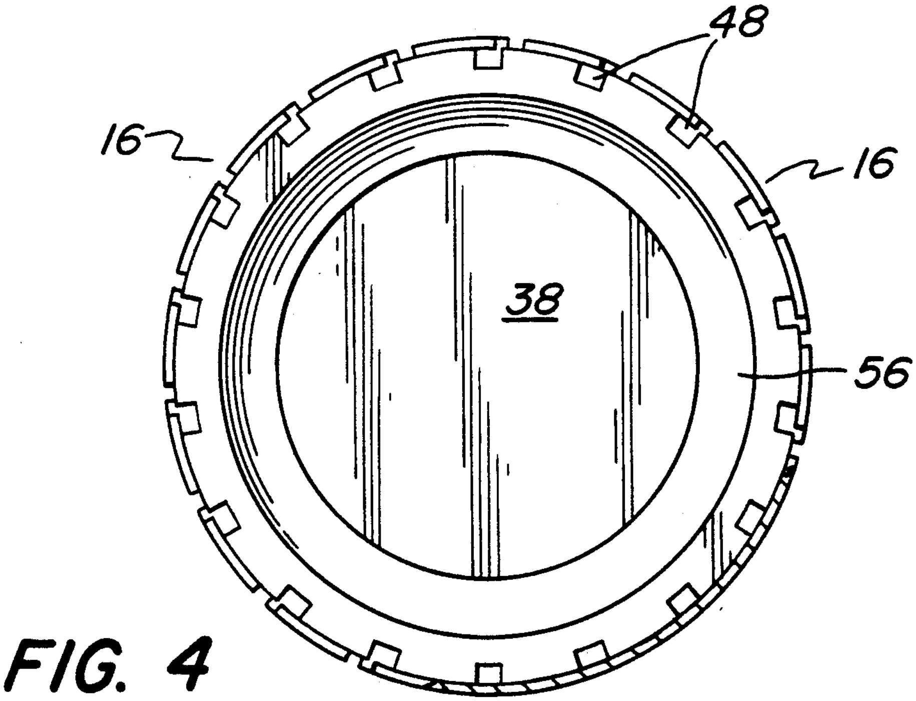
FIG. 4 is a view taken along the lines 4—4 of FIG. 1, which depicts the rear or inside face of the nozzle ring.

When ignition occurs, the flame pattern starts back against the flame holder face of plate 38 and propagates outwardly from the plate. As shown in FIG. 4, the inner face of nozzle ring 16 has a recessed portion 56 tapering from the air nozzles to just above the fuel/air mixture nozzles, which aids in containing the initial flame propagation. The surrounding high velocity helical air swirl confines the flame propagation to a cone pointed along the downstream axis of the chamber, and also provides an insulating barrier for the chamber walls.

Since both swirls receive the same compressor air, there is an automatic proportional adjustment of flow rates with power changes, resulting in stable combustion even at extremely low power and with rapid power changes. This benefit has been observed in the propane model aircraft turbojet, where power can be reduced to the point where combustion is little more than a pencil tip glow and then brought back to high power without flameout. The same stability characteristics were observed in scale-up testing using a 4-inch diameter burner can, indicating that a similar reduction of flameout risk will be found in larger and other fueled engines using this carburetion system.

A second embodiment is shown in FIGS. 5, 6 and 7. The carburetor housing 114 has a centered fuel inlet fitting 132 adapted to receive a fuel nozzle in its center port, and four side ports 134 to receive compressor air. The fuel and air pre-mix in the chamber formed between the inner surface of the housing 114 and the plate 138, as in the previous embodiment.

However, plate 138 has a more complex structure than in the previous embodiment. Plate 138 still has a comparable flat face 139 which acts as a baffle to the incoming mixture, but outside the circumference of the flat face it has a skirt 140 tapered in the downstream direction, which terminates in evenly spaced wedges 142. The sides of the wedges are cut at an angle to the radial direction from the plate's center, and thus create slots 144 which angle and expand outward from the center. The slots 144 act as guide nozzles around the plate 138 for the fuel/air mixture, similar to the posts 42 of the previous embodiment FIG. 7 shows the opposite face of plate 138. It has a recessed flat face 146, which acts as the flame holder plate, surrounded by a continuation of the wedges 142. The wedges on this opposite face extend inward past the circumference of the skirt 140. The slots 144 between the wedges on this opposite face act as nozzles to swirl the mixture across the flame holder plate 146. This embodiment simplifies fabrication, as the plate and wedges can be machined with less complexity than the previous nozzle ring.

The nozzle ring 116 of this embodiment has a circular inner flange 150 and a cylindrical rim 152, against which the plate 138 is seated. The flange 150 seals the top edge of the slots 144 to discharge the fuel/air mixture from the slots in the previously described angled swirl across the flame holder plate 146. The carburetor housing 114 has a skirted rim 115 which fits inside the rim 152 of the nozzle ring when assembled. The outside surface of rim 152 has channels 154, cut at approximately forty-five degrees to the axial direction and tapering toward the downstream direction, to act as the high velocity nozzles which produce the helical swirl of compressor air, as in the previous embodiment. On its opposite face, as shown in FIG. 6, the nozzle ring 116 has a recessed portion 156 tapering from the air nozzles to just above the outlets of the fuel/air mixture nozzles, which aids in confining the initial flame propagation.

Thus, while this invention has been described by reference to certain specific embodiments, and particularly to a model aircraft turbojet engine, it should be apparent to those in the art that it can applied to other embodiments and types of gas turbine engines. For example, while the described embodiments have a single combustion chamber, those skilled in the art will recognize that the invention is applicable in engines having multiple combustion chambers, such as the annular arrangement of burner cans seen in many aircraft engines. Accordingly, the scope of the invention should be determined by reference to the claims which follow.

I claim:

1. A gas turbine engine which includes a carburetion and combustion system comprising:

a combustion chamber;

a mixing chamber engaged with one end of said combustion chamber adapted to receive and mix fuel and air into a combustible mixture;

a first set of nozzles within and positioned around said mixing chamber adapted to receive and direct the fuel/air mixture, in a rotating swirl into a combustion chamber:

ignition means juxtaposed to said combination chamber to ignite the fuel/air mixture to produce combustion gases:

a second set of nozzles, juxtaposed downstream in the direction of gas flow from the first set of nozzles and positioned around said combustion chamber adapted to receive and direct compressed air into the combustion chamber in a helical swirl flow surrounding the fuel/air mixture to contain the combustion gases away from inner walls of the combustion chamber and to provide an insulating layer insulating said walls from combustion heat;

a plate member separating the mixing chamber from the combustion chamber, between said sets of nozzles such that one face of the plate acts as a baffle for fuel and air received into the mixing chamber and the opposite face of the plate acts as a flame holder for the ignited fuel/air mixture;

said first set of nozzles being oriented to direct the fuel/air mixture across the flame holder face of the plate member toward the axial center of the chamber; and means for venting the combustion gases and compressed air into a turbine of the engine.

2. A carburetion and combustion system as in claim 1, wherein the first set of nozzles is arranged in a circular pattern around the circumference of the plate member and each nozzle is directed across the flame holder face at an acute angle to the radius of the plate.

3. A carburetion and combustion system as in claim 2, wherein the second set of nozzles is arranged in a circular pattern around the first set of nozzles and each nozzle is directed downstream in the cylindrical chamber at an acute angle to the radius of the cylinder.

* * * * *